Jan. 5, 1937.  E. H. BLATTNER  2,066,606
DRAFT RIGGING
Filed April 23, 1936   7 Sheets-Sheet 2
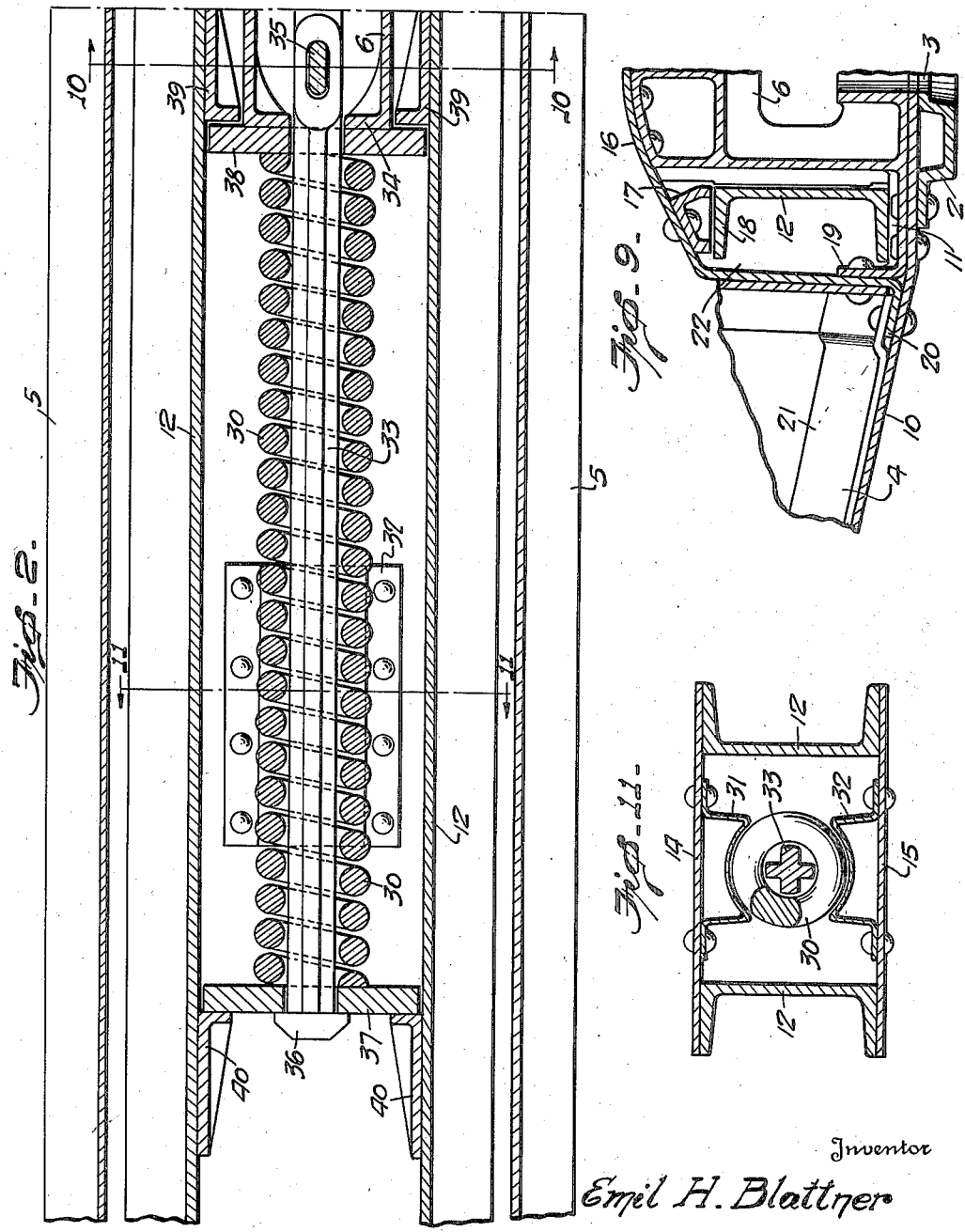
Inventor
Emil H. Blattner
By Ernest F. Mechlin
Attorney

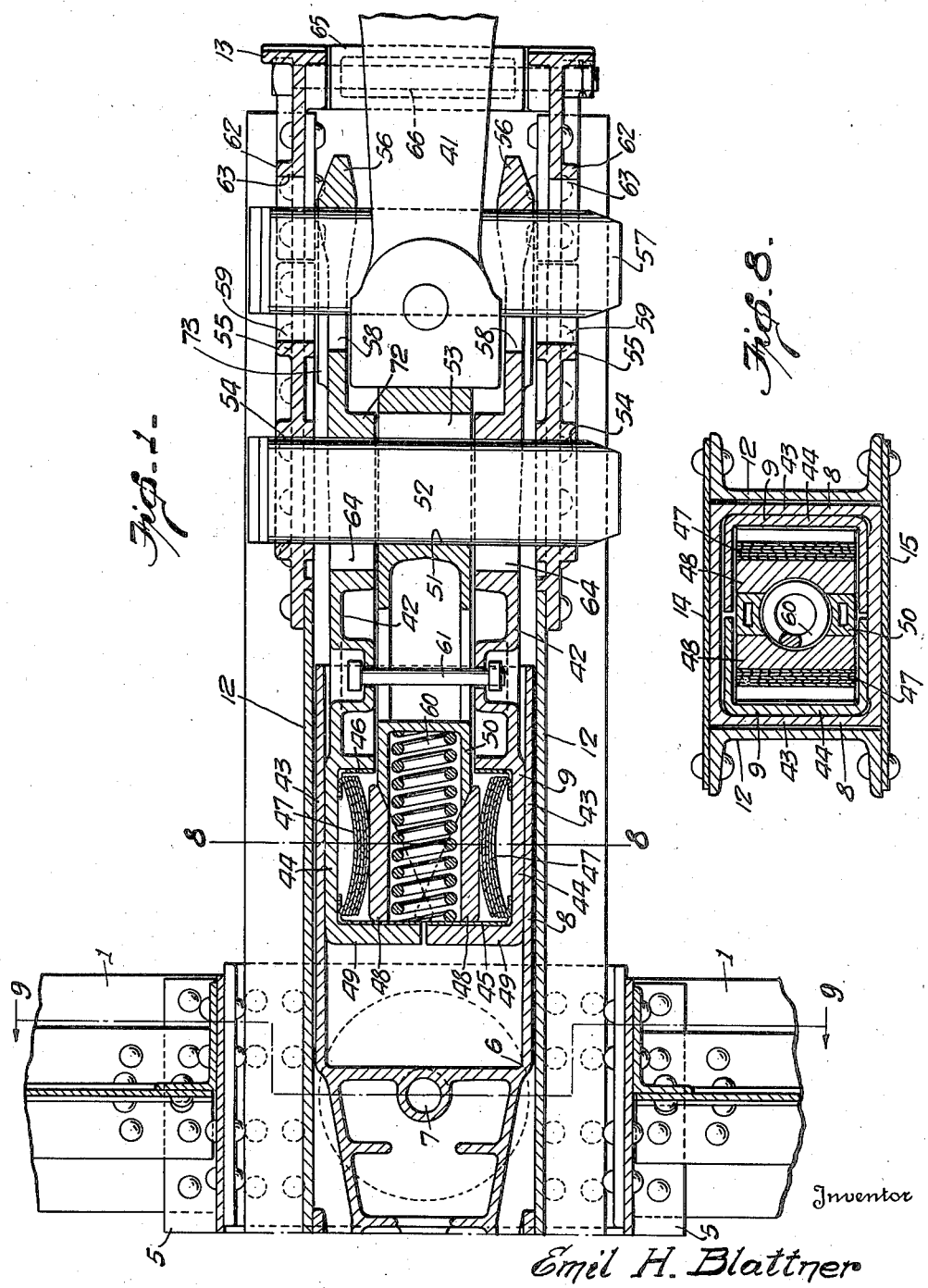

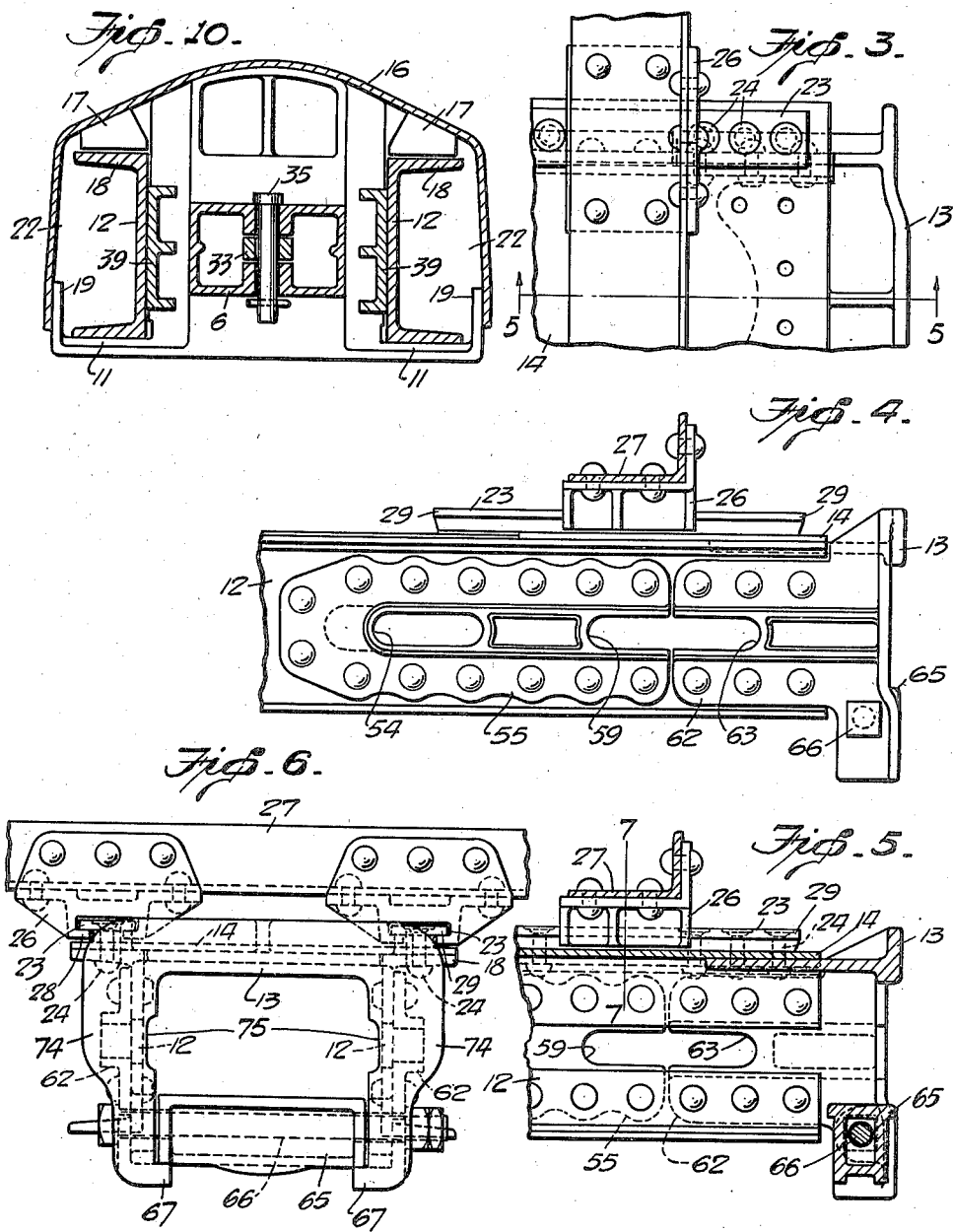

Jan. 5, 1937. E. H. BLATTNER 2,066,606
DRAFT RIGGING
Filed April 23, 1936 7 Sheets-Sheet 4
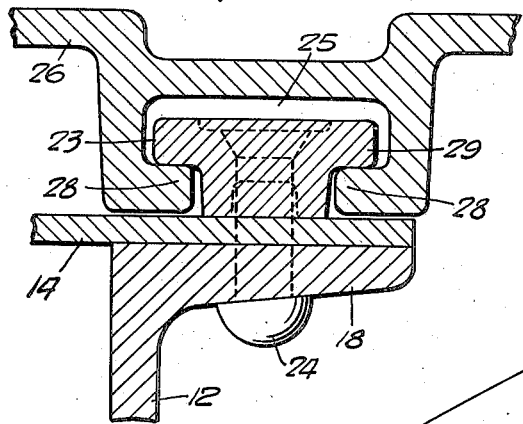
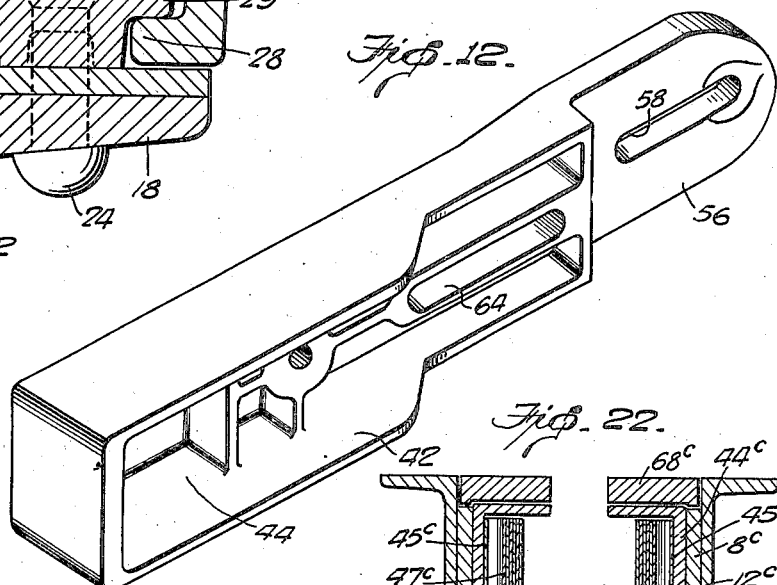
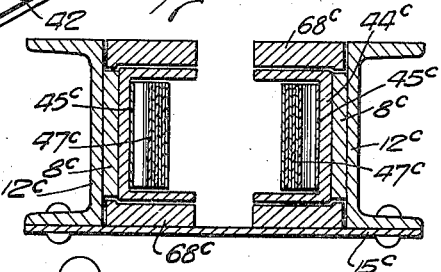
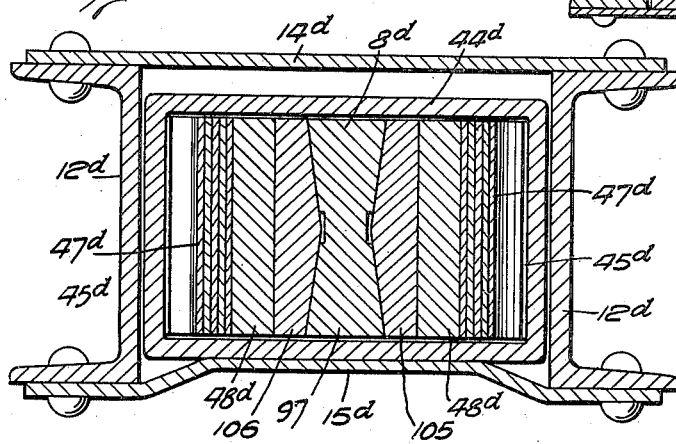
Inventor
Emil H. Blattner
By Ernest S. Mechlin
Attorney

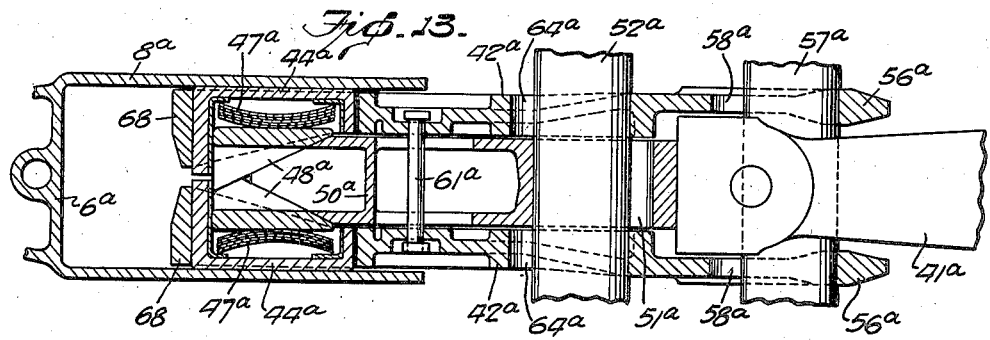
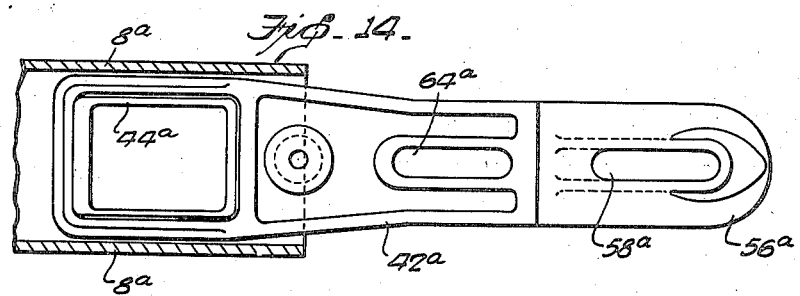
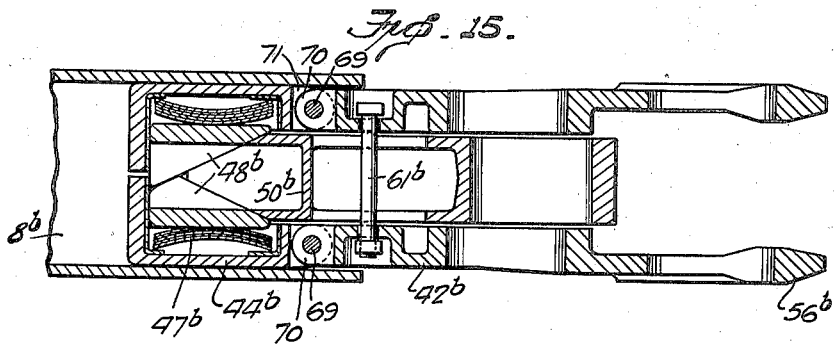
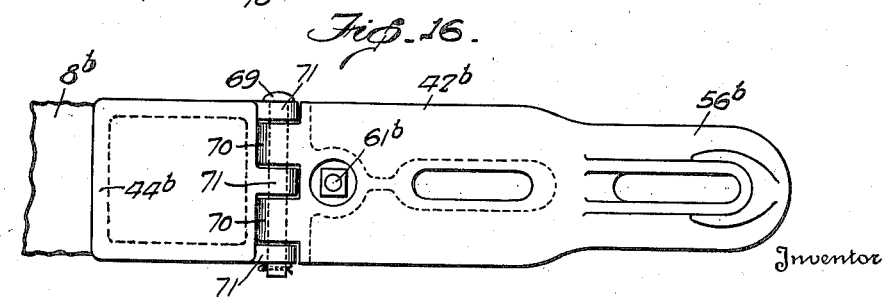

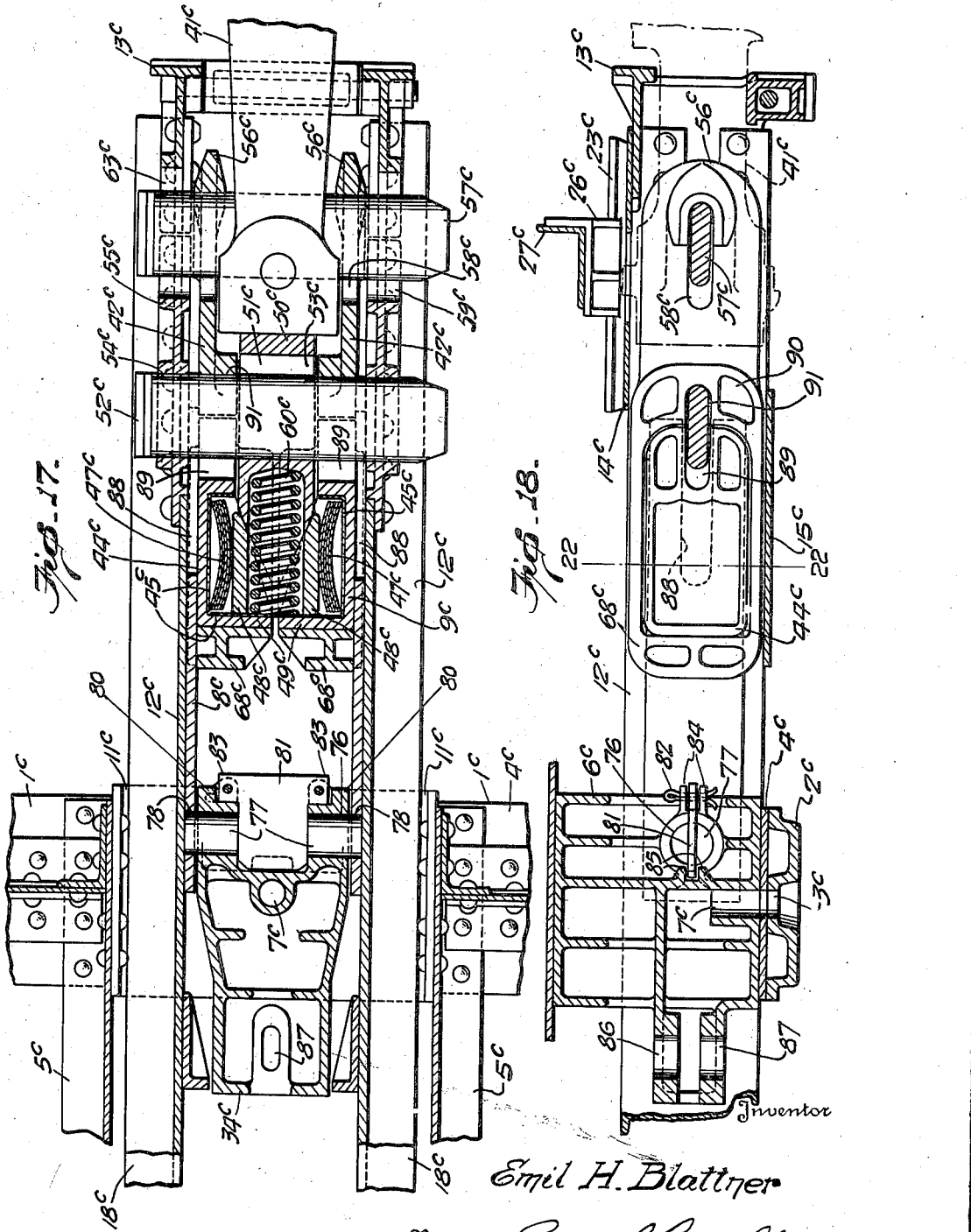

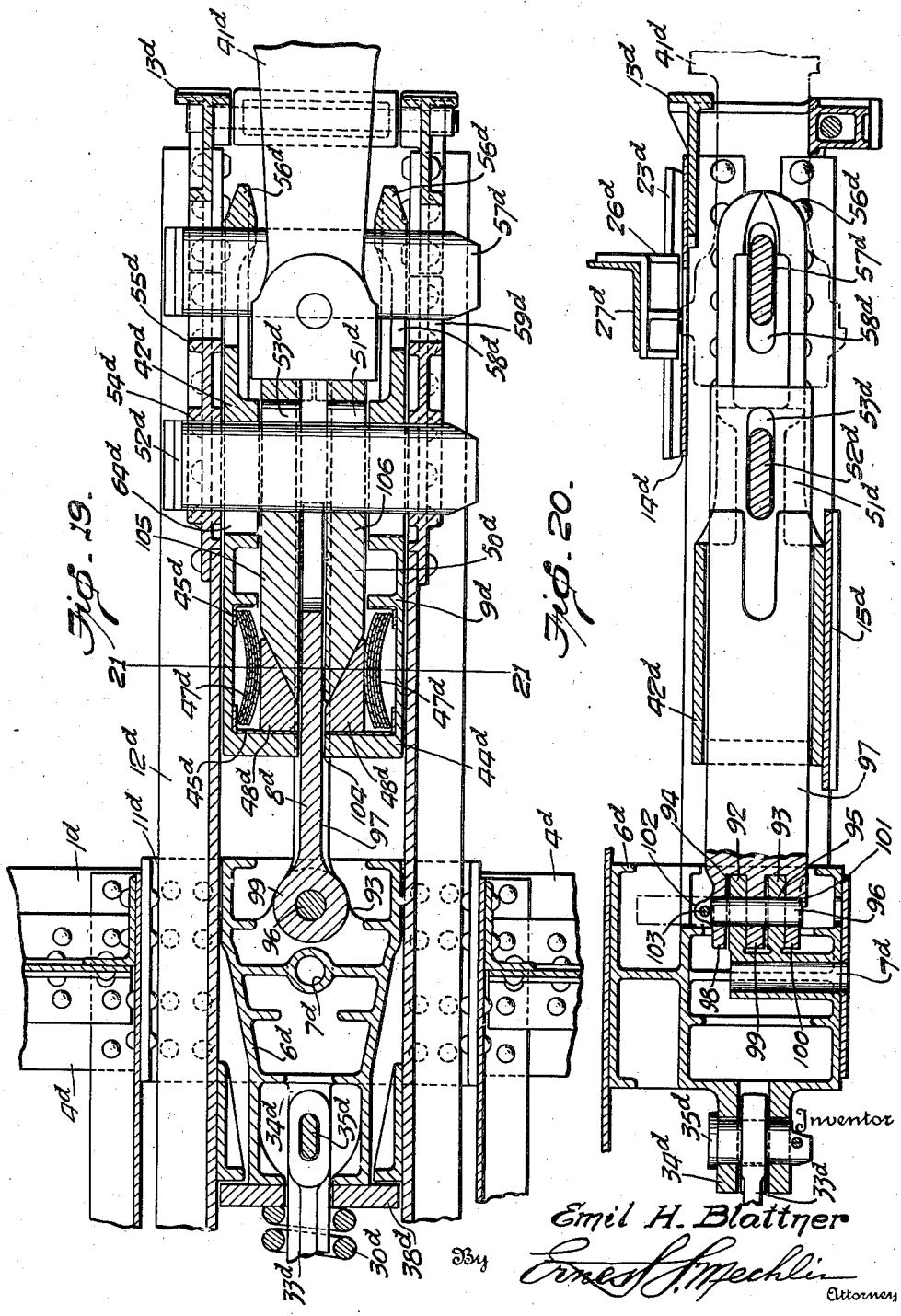

Patented Jan. 5, 1937

2,066,606

UNITED STATES PATENT OFFICE 2,066,606

DRAFT RIGGING

Emil H. Blattner, Rochester, N. Y., assignor to The Symington-Gould Corporation, Rochester, N. Y., a corporation of Maryland Application April 23, 1936, Serial No. 76,042

12 Claims. (Cl. 213—8)

This invention relates to railway vehicles and more particularly to cushioning means for absorbing draft and buffing forces during a relatively long travel, whereby the horizontal shocks to vehicle body and lading are considerably lessened.

One of the objects of my invention is the provision of cushioning means associated with a railway vehicle underframe of the type embodying a floating backbone, or rigid draft and buffing column formed of sills adapted for longitudinal sliding movement with respect to said underframe, said cushioning mechanism being adapted for actuation when an associated coupler is subjected to draft and buffing forces and, when so actuated, simultaneously acting on the underframe and slidably mounted column, so that said column is first moved with respect to said underframe, and the latter finally picked up and moved along therewith.

Another object of my invention is the provision of a railway vehicle underframe having a center filler casting formed with an integral or attached friction generating portion extending forwardly therefrom and engaged by friction cushioning means, said portion forming a relatively stationary friction member for said means.

A further object of my invention is the provision of friction cushioning means for railway vehicles comprising sliding shoes in the form of rectangular boxes standing on edge, with draft link portions extending forwardly therefrom, said link portions being either integral with said boxes, laterally separable therefrom, or pivoted thereto.

A still further object of my invention is the provision of cushioning mechanism for railway vehicles comprising sliding shoes in the form of rectangular boxes standing on edge, each shoe receiving a nest of curved springs and one side wedge, and a center plunger disposed between said side wedges and extended forward and slotted adjacent its front end to take a draft key, with clearance to allow for the desired amount of movement when said extension is engaged by an associated coupler or drawbar.

An additional object of my invention is the provision of cushioning mechanism for a railway vehicle, provided with longitudinally movable sills, characterized by the mechanism simultaneously acting on said sills and underframe, and additionally causing relative movement of said sills with respect to said underframe on both draft and buff, coil spring means being provided to restore the sills and underframe to their normal relationship.

Other objects and advantages of the invention relating to the particular arrangement and construction of the various parts will become apparent as the description proceeds.

Referring to the drawings illustrating my invention, the scope whereof is defined by the appended claims:

Figure 1 is a fragmentary horizontal sectional view of a portion of a railway vehicle underframe and longitudinally movable sills between a bolster and adjacent end sill.

Figure 2 is a view corresponding to Figure 1, but showing that portion of the underframe and movable sills immediately rearward of the bolster, and forming a continuation of the view shown in Figure 1.

Figure 3 is a fragmentary plan of the end portion of the underframe and movable sills which are shown in section in Figure 1.

Figure 4 is a side elevation view of the end portions of the movable sills shown in Figure 1, the end sill thereabove being shown in vertical section.

Figure 5 is a longitudinal sectional view on the line 5—5 of Figure 3, looking in the direction of the arrows, showing the end sill and movable sills therebeneath, with the coupler and associated draft rigging removed.

Figure 6 is a fragmentary end view of the vehicle underframe and movable sills, showing the striking casting and central portion of the end sill.

Figure 7 is a fragmentary sectional view on an enlarged scale, taken on the line 7—7 of Figure 5.

Figure 8 is a transverse sectional view of the movable sills and associated mechanism on the line 8—8 of Figure 1.

Figure 9 is a fragmentary transverse sectional view on the line 9—9 of Figure 1, looking in the direction of the arrows.

Figure 10 is a fragmentary transverse sectional view on the line 10—10 of Figure 2, looking in the direction of the arrows.

Figure 11 is a transverse sectional view of the movable sills and associated mechanism on the line 11—11 of Figure 2, looking in the direction of the arrows.

Figure 12 is a perspective of one of the sliding friction shoes with a draft link extension.

Figure 13 is a fragmentary horizontal sectional view, corresponding to Figure 1, but showing a modification.

Figure 14 is an inside view of one of the draft links and associated sliding friction shoes and fixed friction portion of the underframe, as shown in Figure 13.

Figure 15 is a fragmentary view corresponding to Figure 13 but showing another modification.

Figure 16 is an outside view of one of the draft links, sliding friction shoes pivoted thereto, and associated fixed friction portion of the underframe, as shown in Figure 15.

Figure 17 is a fragmentary horizontal sectional view corresponding to Figure 1, but showing a further modification.

Figure 18 is a fragmentary vertical midsectional view of the arrangement shown in Figure 17, the coupler being indicated diagrammatically, and the center plunger, friction wedges, springs and liners removed.

Figure 19 is a fragmentary horizontal sectional view corresponding to Figure 1, but showing a still further modification.

Figure 20 is a vertical midsectional view of the construction shown in Figure 19, the coupler being indicated diagrammatically.

Figure 21 is a transverse sectional view on the line 21—21 of Figure 19.

Figure 22 is a transverse sectional view on the line 22—22 of Figure 18.

Referring to the drawings in detail, like parts being designated by like reference characters, and first considering the embodiment of my invention illustrated in Figures 1 to 12, inclusive, there are shown fragmentary portions of a railway vehicle underframe 1 adapted to support a suitable body (not shown), and to be mounted on suitable trucks (not shown), with center plates the upper one of which is indicated by the reference character 2 and apertured as indicated at 3 to receive the usual king pin (not shown). The structure at one end only of the vehicle is illustrated, and it will be understood that the opposite end is preferably constructed in a similar manner.

The underframe 1 includes a transverse member or bolster, fragmentary portions of which are indicated by the reference character 4, and any desired number of intermediate cross bearers (not shown), the bolsters and cross bearers being connected by longitudinal underframe members 5. The bolster, as usual, is built around the center filler casting 6 formed with the usual king pin aperture 7 and, in the present embodiment, having a forwardly or outwardly extending hollow box portion 8 receiving the rear or inner end portion of cushioning mechanism 9. The center filler casting 6 has its lower portion secured to the bottom bolster cover plate 10 and center plate 2, as shown most clearly in Figure 9. The center filler casting has laterally extending side portions or shelves 11 on which the longitudinally movable sills 12 normally slide. The sills 12 are connected together at their ends by striking castings 13, only one of which is illustrated, and intermediate their ends by upper and lower cover plates 14 and 15, said cover plates being omitted where the sills 12 pass by the center filler casting 6, as shown most clearly in Figure 9.

The upper portion of the center filler casting 6 has secured thereto a cover plate 16, the side portions of which slope downwardly and outwardly, and have secured thereto wear members 17, which overlie the upper flanges 18 of the preferably channel-shaped sills 12 for guiding purposes. Beyond the wear members 17 the cover plate 16 is bent downwardly and secured to upstanding portions 19 of the center filler casting 6, and then bent outwardly, as indicated at 20, and secured to the bolster bottom cover plate 10 and lower bracing angle 21, thereby providing apertures or receptacles 22 at each side of the central portion of the center filler casting 6 for the reception of the sliding sills 12.

In order to prevent undesired sagging of the ends of the movable sills 12 with respect to the underframe 1, the end portions of said sills have preferably T-shaped supporting elements 23 secured to the upper flanges 18 of said sills, as by means of rivets 24, and sliding in channels 25 formed in preferably cast members 26 secured to the end sill 27 of the railway vehicle, as shown most clearly in Figures 3, 4, 5, 6 and 7. The members 26 desirably have flange portions 28 underlying the outstanding flange portions 29 of the T-shaped securing members 23, said flange portions 29 being adapted to slide on the flange portions 28 with the generation of friction and increase in the capacity of the cushioning mechanism.

To urge the movable column, composed of the sills 12, to stay in normal relationship with respect to the underframe 1, I provide a long coil spring 30 disposed between the sills 12 rearwardly of the center filler casting 6 and desirably guided therebetween by means of pressed members 31 and 32 secured, respectively, to the upper and lower cover plates 14 and 15, as shown most clearly in Figures 2 and 11. The spring 30 is desirably mounted on a corresponding bolt 33, angular or star-shaped in section, as shown most clearly in Figure 11, the front end of said bolt being connected to a rearward extension 34 of the center filler casting 6, as by means of a vertical key 35, and the rear end being provided with a head 36 normally engaged by a rear follower 37. A front follower 38 for the spring 30 normally engages the rear face of the extension 34 and the front end of the spring 30.

The sills 12 have front and rear stop members 39 and 40 which respectively engage the corresponding followers when said sills are moved in one direction or the other with respect to the underframe 1, effecting a corresponding compression of the spring 30 and developing a tendency in the spring to return the movable sills 12 to their normal position with respect to the underframe 1. As shown most clearly in Figure 2, a slight clearance may normally be provided between the front follower 38 and the front stop members 39.

In order to provide friction means for cushioning movement of the coupler 41 with respect to the movable sills 12, and both with respect to the underframe 1 and associated body of the vehicle, I provide the cushioning mechanism 9, the rear end portion of which is received in the forwardly extending box portion 8 of the center filler casting 6. In the present embodiment, the mechanism 9 comprises a pair of sliding friction elements 42 engaging the inner surfaces of the side walls 43 of the box extension 8 and formed as rectangular boxes 44 standing on edge and extended forwardly to form draft links for connection with the coupler or drawbar 41.

Each friction member 42, therefore, comprises an inwardly opening box portion 44 desirably receiving wear plates 45 and 46 engaged by curved plate springs 47 which are, in turn, engaged by friction wedges 48 which frictionally engage the rearmost wear plates 45 or, if said wear plates are omitted, the rear walls 49 of the box portions 44.

Between the two side wedges 48 is interposed a center plunger or spreader wedge member 50, this plunger being extended forwardly and slotted at its front end, as indicated at 51, to receive the transverse second or inner draft key 52 with a desired amount of slot clearance 53 ahead of said key. The key 52 passes through the second slots 54 in cheek plates 55 applied to the outside of the sliding sills 12 or webs of the movable backbone constructed thereof, and corresponding slots 64 in the draft link extensions, and does not travel in the cheek-plate slots but forms a relatively stationary front stop. Slot clearance is provided for forward movement of the members 42 on the key 52. The extension of the draft gear plunger or spreader wedge device 50, therefore, corresponds to a slotted follower block of the sliding type.

The coupler 41 is desirably of the standard swivel butt type, such as described and claimed in the Patent No. 1,431,717, dated October 10, 1922, said coupler being connected to the end portions 56 of the link extensions, by means of the front or outer key 57, passing through slots 58 in said links and corresponding slots or notches 59 in the cheek plates 55, thereby providing for the vertical support of the coupler and links as well as connecting said members together.

Although I have shown a release spring 60 housed in the plunger 50 and disposed between the wedges 48, it will be understood that this spring may be omitted if desired, if the wedging angle is sufficiently large, as illustrated, to make the gear self-releasing.

The friction members 42 are shown secured together by the bolt 61 which also serves to limit outward movement of the plunger member 50 with respect to the friction members 42.

The striking casting 13 is shown of the same general type as that described and claimed in the Patent No. 1,804,081, dated May 5, 1931, that is it is provided with rearwardly extending portions 62 secured to the outside of the webs of the sills 12 and formed with rearwardly opening notches 63 supplementing the forwardly opening notches 59 of the cheek plates 55 to form completed slots for the front key 57.

The coupler carrier member 65 may be of a type corresponding with the Patent No. 1,804,080, dated May 5, 1931, that is, it is secured in place by a transversely extending bolt 66, and has its ends resting on inwardly extending ledges 67, thereby adapting it to be completely removed to leave a space for the convenient application and removal of the coupler 41, the butt of which is, of course, enlarged because it is of the swivel butt type. It will, of course, be understood that I am not limited to the use of the particular type of striking casting and coupler carrier illustrated.

From the foregoing disclosure it will be seen that when the coupler 41 is subjected to the action of draft forces it pulls forwardly on the link ends 56 through the front key 57 causing the friction box portions 44 to slide against the side walls of the center filler extension 8, and in so doing slide the side wedges 48 against the point of the extended center plunger 50, which is normally held stationary relative to the sliding sills 12 by means of the key 52 received in slot 51 therein, slots 54 in the cheek plates 55, and slots 64 in the side links 56. There is, therefore, a double effect, one tending to pull the normally lighter sliding sills 12 outwardly, or slide them with respect to the underframe, and the other tending to directly move the underframe and car body. A normal result, under forces causing acceleration, is for the sliding sills to start first, the underframe and car body following soon after, this follow-up being assisted by the action of the spring 30 which may be under some initial compression and which is compressed upon relative movement between the sills 12 and underframe 1. The compressed spring 30 tends to cause return to normal relationship, inertia tending, after centered position is reached, to cause the underframe and body to overrun the sills. In this way body spring pressure operates to bring the body to its normal position with respect to the backbone or sliding sills 12 after the initial lag, the relative vibration initiated between the sills and spring-connected body being quickly checked by energy absorption in the friction cushioning mechanism 9. Of course, a steady pull, which starts the vehicle slowly, may avoid initial lag between body and sills.

Under buff causing acceleration, a normal result is that the coupler 41 immediately actuates the center plunger 50 which can move to close up the clearance 53 with reference to the stationary key 52, in which event the sliding sills 12 would be directly actuated by the key 52 without the intervention of any cushioning means. However, this going solid of the coupler 41 against the plunger 50 and corresponding portions of the links 56, and the plunger 50 and links 56 against the key 52, is considerably retarded by the action of the wedges 48 on the box portions 44 of the friction members 42, which action is transmitted forwardly through the arms of the friction members 42 to the second key 52, which acts directly on the sills 12, causing them to be moved ahead of the car body, because of the positive, rather than mere frictional connection, the body following soon after, overrunning or tending to overrun the sills, and the vibration therebetween quickly checked, as when the coupler is subjected to draft forces.

Referring now to the embodiment of my invention illustrated in Figures 13 and 14, an arrangement is there shown in which the boxes 44ᵃ, which receive the curved springs 47ᵃ and side wedges 48ᵃ which are urged apart by the center plunger 50ᵃ, are formed separate from the link members 42ᵃ, which members have loops 68 adapted to receive said boxes 44ᵃ, the outer walls of which slide on the box extension 8ᵃ of the center filler casting 6ᵃ, as in the previous embodiment. A release spring (not shown) corresponding with, and positioned like, the spring 60 of the first embodiment may be employed, if desired.

The forward or draft link extensions 56ᵃ of the members 42ᵃ are desirably doubly slotted, as indicated at 58ᵃ and 64ᵃ, to receive the front key 57ᵃ and rear key 52ᵃ for connection with the coupler 41ᵃ, and forward or follower extension of the plunger 50ᵃ, as by passing through a slot 51ᵃ therein. The outer ends of the keys 52ᵃ and 57ᵃ are normally received in slots in the sliding sills (not shown) as in the preceding embodiment. A bolt 61ᵃ desirably holds the link members 42ᵃ together and provides a stop for the plunger 50ᵃ as in the first embodiment, but said link members may be formed integral with one another, like the member 42ᵈ of Figures 19, 20 and 21, if desired.

Referring now to the embodiment of my invention illustrated in Figures 15 and 16, there are shown members 42ᵇ corresponding with the members 42ᵃ of the preceding embodiment, except that the friction boxes 44ᵇ are pivoted to the link portions 56ᵇ by means of vertical pins or bolts 69 passing through intercalated portions or lugs 70 on the links 56ᵇ and 71 on the boxes 44ᵇ. As in the preceding embodiments, the boxes, of course, engage and slide on portions 8$^b$ secured to the vehicle underframe and receive corresponding friction mechanism, such as curved plate springs 47$^b$, side wedges 48$^b$, center plunger member 50$^b$, with or without the coil release springs such as designated by the reference character 60 in the first embodiment. The links 56$^b$ are desirably secured loosely by a connecting bolt 61$^b$, as in the first embodiment.

Referring now to the embodiment of my invention illustrated in Figures 17, 18 and 22, there are shown fragmentary portions of a railway vehicle underframe 1$^c$, as in the first embodiment, provided with a center plate 2$^c$, apertured as indicated at 3$^c$ to receive the usual king pin (not shown) for pivotal connection with an associated truck. The underframe 1$^c$ includes a transverse member or bolster 4$^c$, fragmentary portions of which are illustrated, and any desired number of intermediate cross bearers (not shown), the bolster and cross bearers being connected by longitudinal underframe members 5$^c$, as in the first embodiment.

The bolster, as usual, is built around the center filler casting 6$^c$ formed with the usual king pin aperture 7$^c$ and, in the present embodiment, having generally horizontal apertures or receptacles 76 for two short cantilever pins 77, which pass through corresponding apertures 78 in renewable friction plates 8$^c$, which function similarly to the center filler casting extension 8 of the first embodiment, except that they are laterally movable, to a slight extent, and adapted to be pressed into frictional engagement with the sills 12$^c$.

The pins 77 each desirably have a sliding fit in a hole 76 through a front boss 80 of the center filler 6$^c$. Each of these pins can be inserted separately, and they are held in place in their outward positions, where they pass through the holes 78 in the friction plates 8$^c$, by a T-shaped retainer plate 81, which is, in turn, held by two cotters 82, or other similar fastening means, passing through the outer ears 83 of said plate 81, and corresponding ears 84 on the center filler casting 6$^c$, between which the ears 83 are disposed. The inner end of the plate 81 desirably fits between embracing lug portions 85 extending from the center filler casting 6$^c$.

As in the first embodiment, the center filler casting 6$^c$ has laterally extending side portions or shelves 11$^c$ on which longitudinally movable sills 12$^c$ normally slide. The sills 12$^c$ are connected at their ends by striking castings 13$^c$ and intermediate their ends by upper and lower cover plates 14$^c$ and 15$^c$, the parts not shown preferably being substantially as in the first embodiment.

The ends of the movable sills 12$^c$ preferably have T-shaped supporting elements 23$^c$ secured to the upper flanges 18$^c$ and cover plate 14$^c$, as in the first embodiment and shown most clearly in Figure 7. Said supporting elements 23$^c$ slide in channels formed in preferably cast members 26$^c$ secured to the end sills 27$^c$ of the railway vehicle, as in the first embodiment, and operate in the same way.

In order to urge the movable column, composed of the sills 12$^c$, to stay in normal relationship with respect to the underframe 1$^c$, I provide a relatively long spring (not shown) disposed between the sills 12$^c$ rearwardly of the center filler casting 6$^c$, as in the first embodiment and as shown most clearly in Figure 2. The bolt (not shown) which supports the long spring is connected to a rearward extension 34$^c$ of the center filler casting 6$^c$, as by means of a vertical key (not shown) passing through registering apertures 86 and 87 in said extension 34$^c$, and a corresponding aperture in the front end portion of the bolt which is disposed between the apertured portions of said extension 34$^c$. The parts rearwardly of the center filler casting, which are not illustrated, correspond with those of the first embodiment.

In order to provide friction means for cushioning movement of the coupler 41$^c$ with respect to the movable sills 12$^c$, and both with respect to the underframe 1$^c$ and the associated body of the vehicle, I provide cushioning mechanism 9$^c$, the rear end portion of which is disposed between the forwardly extending friction plates 8$^c$.

In the present embodiment, the mechanism 9$^c$ comprises friction boxes 44$^c$ which receive curved plate springs 47$^c$ and side wedges 48$^c$ which are urged apart by the center plunger 50$^c$. The boxes 44$^c$ are formed separate from the draft link members 42$^c$ which members have loops 68$^c$ receiving said boxes 44$^c$, and extended sufficiently beyond the friction walls of the boxes 44$^c$, to form guides for the friction plates 8$^c$, as shown most clearly in Figure 22. The outer walls of the boxes 44$^c$ slide on the friction plates 8$^c$ and press and spread the latter into frictional engagement with the inner surfaces of the webs of the sliding sills 12$^c$, thereby increasing the frictional action of the mechanism. A release spring 60$^c$ may be employed, as in the first embodiment (or omitted if desired, because the wedges 48$^c$ may be blunt enough to be self-releasing), and acts between the center plunger 50$^c$ and the rear walls 49$^c$ of the boxes 48$^c$, engaging the wear plates 45$^c$, if used.

In the present embodiment, the boxes 44$^c$ are relatively longer than the boxes 44$^a$ of the embodiment of Figures 13 and 14, and the forward portions thereof are bifurcated, as indicated at 89, to receive the second draft key 52$^c$. The looped portions 68$^c$ of the draft links 42$^c$ are accordingly extended, as illustrated, and desirably strengthened by having their front and rear portions generally H-shaped in section, the front portions 90 being each formed with a notch 91 complementary to the notches 89 for receiving the forward edge portion of the key 52$^c$.

The center plunger 50$^c$ is extended forwardly and slotted at its front end, as indicated at 51$^c$, to receive the draft key 52$^c$ with a desired amount of slot clearance 53$^c$ ahead of said key. The key 52$^c$ passes through the second slots 54$^c$ in cheek plates 55$^c$ applied to the outside of the sliding sills 12$^c$, and does not travel in the cheek plate slots, but forms instead a front stop for the plunger 50$^c$ and boxes 44$^c$. Clearance for forward movement of the draft link members 42$^c$ on the key 52$^c$ is provided by rearward extension of the notches 89 in the draft gear boxes 44$^c$. The extension of the draft gear plunger or spreader wedge device 50$^c$ corresponds to a slotted follower block of the sliding type, as in the first embodiment.

The coupler 41$^c$, which may be of the same type as in the first embodiment, is connected to the end portions 56$^c$ of the link members 42$^c$ by means of the front or outer key 57$^c$ passing through slots 58$^c$ in said members and corresponding slots or notches 59$^c$ in the cheek plates 55$^c$.

Inasmuch as the draft link members 42$^c$ are considerably shorter than in the first embodiment, I do not employ a transverse bolt for securing them together, although, if desired, they could be made in one piece or integrally connected one to the other, as in the embodiment of Figures 19, 20 and 21. The striking casting 13c and other parts not completely illustrated or described desirably correspond to the showing of the first embodiment.

The action of the mechanism of the present embodiment corresponds with that of the embodiment of Figures 13 and 14, except that the frictional resistance is increased by having the plates 8c pressed against the inner surfaces of the sliding sills 12c.

Under buff the coupler 41c first moves the center plunger 50c in between the wedges 48c, and the friction boxes 44c may or may not slide initially on the pin-connected friction plates 8c, depending on frictional balance. When the coupler has reached the limit of the travel of the diminutive draft gear 9c illustrated, the side links are picked up, and, through the medium of the second key, the floating sills 12c move with the coupler from that point on.

We, therefore, have a double frictional effect, because the moving sill webs and the friction boxes are sliding in unison on the friction plates until the inertia of the car body is overcome. Upon the release of the buffing stroke, the pressure is decreased on the friction plates 8c and the floating sills 12c restored to normal position relative to the body and underframe 1c by means of the long springs, corresponding with those designated by the reference character 30 of the first embodiment.

Under draft the sequence of operations is the same, except that the side links 42c draw the friction boxes ahead over the point of the plunger, held momentarily stationary by the movable sills 12c. Although it might be thought that the friction plates 8c only overlap the friction boxes for a short distance, upon considering Figure 17, yet the section is taken through the slots 88, and these slotted friction plates 8c desirably extend forward slightly beyond the center of the second key 52c.

Referring now to the embodiment of my invention illustrated in Figures 19, 20 and 21, there are shown fragmentary portions of a railway vehicle underframe 1d including portions of a bolster 4d forming part thereof, said bolster being built around and comprising a center filler casting 6d, formed with the usual king pin aperture 7d and, in the present embodiment, having forwardly extending vertically spaced web portions 92 and 93 provided with registering apertures 94 and 95, respectively, for receiving the normally vertical pin 96 for pivotally securing a friction element 97 thereto.

The friction element 97 desirably has a plurality of rearwardly extending webs or flanges 98, 99 and 100 intercalated with the webs 92 and 93 and formed with registering apertures for the reception of the pivot pin 96. The lower flange 100 may be formed with a ledge or shelf 101 normally underlying the pin 96 for holding it in place, or preventing it from dropping out of position. The upper flange or web 98 desirably carries apertured lugs 102 for receiving a retaining cotter, or other securing means 103, which normally overlies the upper end of the pin 96 and prevents undesired removal thereof.

The upper web of the center filler casting 6d is desirably high enough above the pin apertures in the member 97, to allow the pin to be inserted in place to drop from the position shown in dot-dash lines to that shown in full lines.

As in the first embodiment, the center filler casting 6d has laterally extending side portions or shelves 11d on which longitudinally movable sills 12d normally slide. The sills 12d are connected at their ends by striking castings 13d and intermediate their ends by upper and lower cover plates 14d and 15d, the parts not shown preferably being substantially as in the first embodiment.

The ends of the movable sills 12d are desirably supported from the end sills 27d by means of T-shaped supporting elements 23d and cast members 26d, as in the first embodiment. In order to urge the movable column, composed of the connected sills 12d, to stay in normal relationship with respect to the underframe 1d, I provide a relatively long coil spring 30d disposed between followers, the front one 38d only being illustrated, but the construction not illustrated being preferably as in the first embodiment. The bolt or rod 33d, on which the spring 30d is mounted, is connected to a rearward extension 34d of the center filler casting 6d by means of a vertical key 35d, passing through registering apertures in said extension 34d, and a corresponding aperture in the front end portion of a bolt 33d, which is disposed between the apertured portions of said extension 34d, as in the first embodiment.

In order to provide for cushioning movement of the coupler 41d with respect to the movable sills 12d, and both with respect to the underframe 1d and the associated body of the vehicle, I provide cushioning mechanism 9d, the rear end portion of which has an aperture 104 for receiving the forward portion 8d of the pivoted member 97, which portion operates as a friction post for the mechanism.

In the present embodiment, the mechanism 9d comprises a friction box 44d, in which is formed the aperture 104, said box opening forwardly or outwardly for the reception of curved plate springs 47d, which will engage wear plates 45d, if used, and side wedges 48d which are urged apart by spreader means 50d. The spreader or plunger means 50d, in the present embodiment, comprises two laterally separated parts 105 and 106, one of which forces the wedge 48d, from one side of the friction post device 8d, and the other forces the other wedge 48d from the other side of the friction post device 8d.

The outer walls of the friction box 44d are guided between the webs of the movable sills 12d and supported on the cover or carrier plate 15d. Although I have shown the box 48d formed as a single casting, if desired, each side portion may be formed separate, as in the first embodiment. The wedges 28d are formed blunt enough to make the arrangement self-releasing and avoid the necessity of a release spring corresponding with that designated 60 in the first embodiment.

In the present embodiment, the friction box or boxes 44d has or have forward extensions forming draft arms or link portions 42d, as in the first embodiment. The center plunger portions 105 and 106 are extended forwardly and slotted near their front ends, as indicated at 51d, to receive the second draft key 52d, with a desired amount of slot clearance 53d ahead of said key. The key 52d passes through the second slots 54d to the cheek plates 55d applied to the outside of the sliding sills 12d, and does not travel in the cheek plates, but forms instead a front stop for the plunger portions 105 and 106 and combined friction box 44d and draft arms 42d. Clearance for forward movement of the arms 42d on the key 52d is provided by rearward extension of the slots 64d therein.

The coupler 41d, which may be of the same type as in the first embodiment, is connected to the end portions 56d of the draft arms 42d by means of the front or outer key 57d passing through slots 58d in said arms and corresponding slots or notches 59d in the cheek plates 55d.

Inasmuch as the friction box 44d, and draft arms or link extensions 42d extending therefrom, are preferably formed as an integral casting, it is unnecessary to secure them together by a bolt, as in the first embodiment. If, however, they are formed separate, as in the first embodiment, a bolt may be employed in a similar manner, or they may be used without the bolt, as in the embodiment of Figures 17 and 18. The striking casting 13d, and other parts not completely illustrated or described, desirably correspond to the showing of the first embodiment.

The action of the mechanism of the present embodiment corresponds with that of the first embodiment, except that if the friction box 44d is formed in one piece there is no substantial amount of friction between said box and the sliding sills 12d, the friction instead being between the plunger portions 105 and 106, the wedges 48d on either side thereof, and the friction post portion 8d disposed therebetween.

Under buff, the coupler 41d first moves the plunger portions 105 and 106 in between the wedges 48d and the friction post 8d, the wedges 48d being simultaneously spread outwardly and flattening the curved plate springs 47d. At the same time the sills 12d will move to some extent with the coupler through the action of the wedges 48d on the friction box 44d which, in turn, acts through the draft arm extensions 42d on the key 52d, and sills 12d through which said key passes. When the coupler has reached the limit of travel of the gear 9d, the side arms or links 42d are directly engaged, and through the medium of the second key, the floating sills 12d move at the same speed as the coupler from that point on.

Upon release of the buffing stroke, the pressure is decreased between the friction post portion 8d and the plunger wedges 105 and 106, allowing the floating sills to be restored to normal position relative to the underframe and body by means of the long spring 30d.

Under draft, the coupler 41d pulls forwardly on the link ends 56d through the front key 57d, causing the friction box 44d to move forwardly and slide the wedges 48d apart over the plunger portions 105 and 106, flattening the curved plate springs 47d, said plunger portions being normally held stationary relative to the sills 12d by means of the key 52d. There is, therefore, a double effect, one tending to pull the sliding sills 12d outwardly, or slide them with respect to the underframe, and the other tending to directly move the underframe and car body through the frictional action on the post 8d secured to the center filler casting 6d. Inasmuch as the sliding sills 12d are lighter than the underframe and car body, they will start first, the body following soon after, and this follow-up is assisted by the action of the spring 30d, which is compressed upon relative movement between the sills 12d and underframe 1d.

Details of construction, applicable to all forms of the invention, but described in connection with the first form only, include reinforcements 72 around the second key slot 64 in the draft arms 56, closing up the excess space therebetween and serving to transfer some of the over-solid blow to the key 52 nearer its abutments in the cheek plates 55, when the coupler 41 moves rearwardly on buff and closes up the space 53 forwardly of the key 52.

This reinforcement 72 around the second key slots not only serves to transfer some of the buffing load from the coupler 41 to the key 52, with a decrease in the bending moment thereof, and from thence to the abutments in the cheek plates 55, but it increases the strength of the links 56 from their front end progressively toward the friction portions, or parts connected to said friction portions, and provides the desired increase in bearing area between said links and the rear edge of the key 52, when said links go solid against said rear edge upon the application of draft forces, for transmitting such forces from said links to the cheek plates 55 and movable sills 12 of the vehicle.

All of the links 56 desirably have outer guiding strips or ribs 73 adjacent their forward ends, framing the front slots 58, and extending rearwardly therebeyond, to prevent undue lateral shifting as well as provide increased bearing area for the front key 57.

The striking casting used with any form of the invention desirably has its front web 74 notched or cut away, as indicated most clearly at 75 in Figure 6, to facilitate side link assembly and removal.

From the foregoing disclosure and accompanying drawings, it will be seen that I have provided an improved mechanism for cushioning draft and buffing forces received by the coupler, and absorbing the energy thereof through a relatively long travel, which first involves movement of a floating backbone, rigid draft and buffing column, or longitudinally movable sills, which extend substantially the length of a vehicle underframe, with respect to the relatively fixed portion of said underframe, and then the follow-up of the underframe, due not only to friction means which initially cushions the force, but also to preferably long-travel coil springs adjacent and inward of each bolster, which act to urge the movable backbone or sills to return to normal position with respect to the associated underframe, when moved therefrom by the action of draft or buffing forces.

It will be understood that although I have illustrated only one end portion of a vehicle underframe, including portions of a single bolster, the underframe, of course, includes a pair of bolsters, and the construction of the other end portion (not shown) corresponds with the end portion shown. In other words, not only is the striking casting and friction cushioning mechanism preferably duplicated at the other end of the movable sills, but the long centering spring designated by the reference character 30 as well. It will also be understood that features of one embodiment may be substituted for those of another, that is, friction portions connected to the center filler casting of one form may be substituted in another form of the invention for those illustrated, and the friction elements associated with or including draft arm portions of one form of my invention may be substituted for those illustrated in another form within the spirit and scope of the invention as contemplated by me, and the same thing applies to other features not here specifically enumerated.

Although preferred embodiments of my invention have been illustrated, it will be understood that modifications may be made within the spirit and scope of the appended claims.

I claim:

1. In railway draft rigging, in combination with a rigid draft and buffing column comprising spaced sills, a body bolster comprising a center filler casting having means extending outwardly therefrom to provide relatively stationary friction surfaces, friction members engaging said surfaces and forming parts of cushioning mechanism comprising housing portions and outward extensions forming draft links, inner portions of said mechanism being formed with pockets opening toward each other, friction wedges movable laterally in said pockets, wedging means fitting between said friction wedges and adapted to be actuated by an associated coupler connected to said links, and resilient means disposed in said pockets and acting on said wedges and the outer walls of said housing portions, and stressed by lateral movement of said wedges when said wedging means is forced therebetween.

2. In railway draft rigging, in combination with a rigid draft and buffing column comprising spaced sills, a body bolster comprising a center filler casting having an outwardly opening pocket, friction members with their inner ends received in and frictionally engaging the side walls of said sills to provide relatively stationary friction said links, said inner portions being formed with pockets opening toward each other, friction wedges movable laterally in said pockets, wedging means fitting between said friction wedges and adapted to be actuated by an associated coupler connected to said links, resilient means disposed in said pockets acting on said wedges and the outer walls of said friction members, and stressed by lateral movement of said wedges when said wedging means is forced therebetween, and means securing said friction members together and serving to limit outward movement of said wedging means.

3. In railway draft rigging, in combination with a rigid draft and buffing column comprising spaced sills, a body bolster comprising a center filler casting having means extending outwardly therefrom to provide relatively stationary friction surfaces, said means being disposed between said sills, friction members engaging said surfaces, draft link members with inner looped end portions receiving said friction members, said friction members being formed with pockets opening toward each other, friction wedges movable laterally in said pockets, wedging means fitting between said links and friction wedges and adapted to be actuated by an associated coupler connected to said links, and resilient means disposed in said pockets acting on said wedges and the outer walls of said friction members, and stressed upon lateral movement of said wedges for urging said friction members into engagement with said relatively stationary friction surfaces.

4. In railway draft rigging, in combination with spaced sills, a body bolster comprising a center filler casting, means extending outwardly from said casting and disposed between said sills to provide relatively stationary friction surfaces, friction boxes engaging said friction surfaces and opening toward each other, friction wedges movable laterally in said boxes, wedging means fitting between said boxes and wedges and adapted to be actuated by an associated coupler, resilient means disposed in said pockets, acting on said wedges and the outer walls of said friction boxes, and stressed upon lateral movement of said wedges, for urging said boxes into engagement with said stationary friction surfaces, and draft link members with their inner end portions pivoted to forward portions of said boxes and their outer end portions slotted for connection with said coupler.

5. In railway draft rigging, in combination with spaced sills, a body bolster comprising a center filler casting, a pair of plates each extending outwardly from said casting along the inner surfaces of said sills and with their inner portions secured to said casting and adapted for slight lateral movement into frictional engagement with said sills, to provide relatively stationary friction surfaces, friction members disposed between said sills and normally engaging said surfaces, draft link members with inner looped end portions receiving said friction members, said friction members having pockets opening toward each other, friction wedges movable laterally in said pockets, wedging means fitting between said links and friction wedges, adapted to be actuated by an associated coupler connected to said links, and resilient means disposed in said pockets, acting on said wedges and the outer walls of said friction members, and stressed upon lateral movement of said wedges, for urging said friction members into engagement with said relatively stationary friction surfaces.

6. In railway draft rigging, in combination with spaced sills, a body bolster comprising a center filler casting, a friction member secured to said casting and extending outwardly between said sills to provide relatively stationary friction surfaces, a housing member apertured to receive said friction member and with outer end portions extending therefrom and forming draft arms, each draft arm portion being disposed adjacent a sill and spaced from the other draft arm portion, friction wedges disposed in said housing member on opposite sides of said friction member and movable laterally therein, a plunger wedge acting between each side of said friction member and the adjacent friction wedge for urging said wedge away from said friction member toward an outer wall of said housing member, and resilient means disposed in said housing member outwardly of each friction wedge and stressed by lateral movement of said wedges when the plunger wedges are forced inwardly between said friction wedges and friction member.

7. In a car underframe of the type embodying a rigid draft and buffing column comprising spaced sills connected by cover plates and striking castings, extending substantially the length of said underframe, and mounted for longitudinal sliding movement relative thereto, a body bolster forming part of said underframe and comprising a center filler casting, resilient means disposed between said sills, secured to an inner portion of said casting and serving to resiliently urge said sills into centered relation with respect to said body bolster, friction means extending outwardly from said casting and providing friction surfaces fixed against longitudinal movement with respect to said underframe, and cushioning mechanism mounted between said sills outwardly of said casting and comprising friction members cooperating with one another and movable with respect to said sills and casting, certain of said friction members also frictionally engaging the friction surfaces on the means secured to said casting, whereby movement with respect to said sills and underframe, of an associated coupler, is cushioned by said mechanism, and longitudinal sliding of said sills with respect to said underframe is cushioned by said first-mentioned resilient means and friction elements of said cushioning mechanism sliding on the friction surfaces of said outwardly extending friction means.

8. In a car underframe of the type embodying a rigid draft and buffing column comprising spaced sills extending substantially the full length of said underframe and mounted for sliding movement relative to fixed portions thereof, a body bolster forming part of said underframe and comprising a center filler casting, a relatively long coil spring disposed between said sills and mounted on a longitudinally extending rod, one end of said rod being connected to said filler casting, a follower mounted on said rod at each end of said spring, stop means secured to said sills and engaging said followers to stress the spring upon movement of said sills out of normal relation with respect to said underframe, the other end of said center filler casting having means extending outwardly therefrom to provide relatively stationary friction surfaces, friction members engaging said surfaces and forming parts of cushioning mechanism comprising housing portions and outward extensions forming draft members, inner portions of said mechanism being formed with pockets opening toward one another, friction wedges movable laterally in said pockets, wedging means fitting between said wedges and adapted to be actuated by an associated coupler connected to said draft members, and resilient means disposed in said pockets, acting on said wedges and the outer walls of said housing portions, and stressed upon lateral movement of said wedges when said wedging means is forced therebetween.

9. In a car underframe of the type embodying a rigid draft and buffing column comprising spaced sills connected by cover plates and striking castings, and mounted for sliding movement relative to fixed portions of said underframe, a body bolster forming part of said fixed underframe portions and comprising a center filler casting, a relatively long coil spring disposed between said sills and mounted on a longitudinally extending rod, one end of said rod being connected to an inner portion of said filler casting, a follower mounted on said rod at each end of said spring, stop means secured to the inner faces of said sills and adapted to engage said followers to stress the spring upon movement of said column out of its normal relation with respect to said bolster, the outer end of said center filler casting being formed with means extending therefrom and providing spaced friction surfaces, friction members engaging said surfaces and comprising housing portions and draft member portions, said housing portions having pockets opening toward each other, friction wedges movable laterally in said pockets, wedging means fitting between said friction wedges and adapted to be actuated by an associated coupler connected to said draft member portions, and resilient means disposed in said pockets, acting on said wedges and the outer walls of said housing portions, and stressed upon lateral movement of said wedges when said wedging means is forced therebetween.

10. A center filler casting formed with an integral hollow box extending outwardly therefrom to form a stationary friction member for associated cushioning mechanism.

11. A member for cushioning mechanism comprising friction shoes with laterally opening pockets adapted to receive resilient means and friction wedges and a slotted draft member secured thereto and extending therefrom for connection with an associated coupler.

12. A center plunger for cushioning mechanism comprising a wedge-shaped end portion formed with a longitudinally opening pocket for receiving a release spring, the other end portion of said member being slotted for receiving a connecting draft key and having a generally flat end face for taking buffing forces from an associated coupler.

EMIL H. BLATTNER.